United States Patent [19]

Oles

[11] Patent Number: 4,616,992
[45] Date of Patent: Oct. 14, 1986

[54] SHUTTLE-TYPE BLOW MOLDING MACHINE WITH IN-MOLD LABELING

[75] Inventor: Paul M. Oles, York, Pa.

[73] Assignee: Y Technipak Corp., York, Pa.

[21] Appl. No.: 743,948

[22] Filed: Jun. 12, 1985

[51] Int. Cl.⁴ ............................................. B29C 59/02
[52] U.S. Cl. ..................................... 425/503; 264/509; 425/504; 425/522
[58] Field of Search ............... 425/503, 504, 522, 539, 425/116; 264/509; 156/86, 539, 569–572; 271/5, 10–12, 14, 91, 93, 95, 99, 92, 102, 131, 132; 414/125, 128

[56] References Cited

U.S. PATENT DOCUMENTS

| | | | |
|---|---|---|---|
| 3,292,209 | 12/1966 | Borkmann | 425/522 X |
| 3,324,508 | 6/1967 | Dickinson | 425/522 X |
| 3,526,690 | 9/1970 | Bachman | 264/107 |
| 3,627,309 | 12/1971 | Ganz | 271/91 |
| 3,657,405 | 4/1972 | Langecker | 264/89 |
| 3,749,396 | 7/1973 | Pierre | 271/5 |
| 3,941,642 | 3/1976 | Schnier | 156/571 X |
| 4,114,872 | 9/1978 | Davies et al. | 271/91 |
| 4,335,635 | 6/1982 | Hautemont | 264/509 X |
| 4,355,967 | 10/1982 | Hellmer | 425/503 |
| 4,397,625 | 8/1983 | Hellmer et al. | 425/135 |
| 4,479,644 | 10/1984 | Bartimes et al. | 425/503 X |
| 4,479,770 | 10/1984 | Slat et al. | 425/503 |
| 4,479,771 | 10/1984 | Slat et al. | 425/503 |
| 4,498,854 | 2/1985 | Ross | 425/116 |
| 4,549,863 | 10/1985 | Bourgeois | 425/503 X |
| 4,552,526 | 11/1985 | Hafele | 425/522 |
| 4,563,148 | 1/1986 | Hasl et al. | 425/503 |
| 4,582,474 | 4/1986 | Ziegler | 425/539 X |
| 4,585,408 | 4/1986 | Darr | 425/504 X |

FOREIGN PATENT DOCUMENTS 43260 4/1977 Japan ................................. 271/91

OTHER PUBLICATIONS

Hasl PCT Application No. WO85/00554, published 2/14/85.

Primary Examiner—Richard L. Chiesa
Attorney, Agent, or Firm—Thomas Hooker

[57] ABSTRACT

A shuttle-type blow molding machine with a label transfer assembly for placing labels in mold halves before the mold halves close on a parison.

11 Claims, 6 Drawing Figures

SHUTTLE-TYPE BLOW MOLDING MACHINE WITH IN-MOLD LABELING

This invention relates to an improved machine for blow molding containers with labels and more particularly to a shuttle-type blow molding machine with a label transfer assembly for placing labels in open mold halves before the mold halves close on a parison.

Shuttle-type blow molding machines include a mold transfer carriage carrying one or more pairs of mold halves which is moved back and forth between an extrusion station and a blow mold station. Each mold half is closed around a parison formed at the extrusion station. The closed molds are moved to the blow mold station where the parisons are expanded within the mold cavities to form blow molded containers. The mold or molds are then opened, the containers are ejected, the open mold halves are returned to the extrusion station and the cycle is repeated. The extrusion and blow mold stations are preferably located close together to reduce the amount of time required to transfer the mold halves between the stations and the size of the machine.

The present machine includes a shuttle-type blow molding assembly and a label transfer assembly located immediately adjacent the blow mold station, the assembly including a transfer carriage with a pair of long label transfer arms with heads on the free ends of the arms. The carriage moves the arms back and forth between a forward position where the heads are located in the extrusion station and a back position where the transfer heads are positioned adjacent label pick-up locations at a pair of label magazines. When the arms are in forward or back positions they may be moved laterally apart by a drive on the carriage so that the heads pickup labels from the magazines and transfer the labels to the mold halves.

The arms are moved laterally toward and away from each other on the carriage between opened and closed positions by a drive including a double ended pivot arm mounted on the carriage with opposed ends carrying rollers engaging slots on a pair of slide assemblies supporting the arms. The slide assemblies are mounted on slide rods extending transversely to the direction of movement of the carriage toward and away from the extrusion station. A fluid cylinder moves one of the slide bodies along the rods. The movement of this slide body, reversed in direction, is transferred to the other slide body through the pivot arm so that the slide bodies and arms move toward and away from each other in response to extension and retraction of the fluid cylinder.

The location of the label transfer assembly adjacent to but separate from the blow molding assembly extrusion station enables the assemblies to be inspected and maintained independently of each other. Also, the label transfer assembly may be deactivated during blow molding of containers without labels. The label transfer assembly may be used to deliver one or two labels to the mold halves, as required by given production runs. The label transfer assembly cycle of operation is integrated with the cycle of operation of the blow molding assembly to supply labels to the extrusion station with a minimum increase in the total cycle time of the blow molding machine.

Other objects and features of the invention will become apparent as the description proceeds, especially when taken in conjunction with the accompanying drawings illustrating the invention, of which there are 3 sheets and one embodiment.

IN THE DRAWINGS

Figure 1:
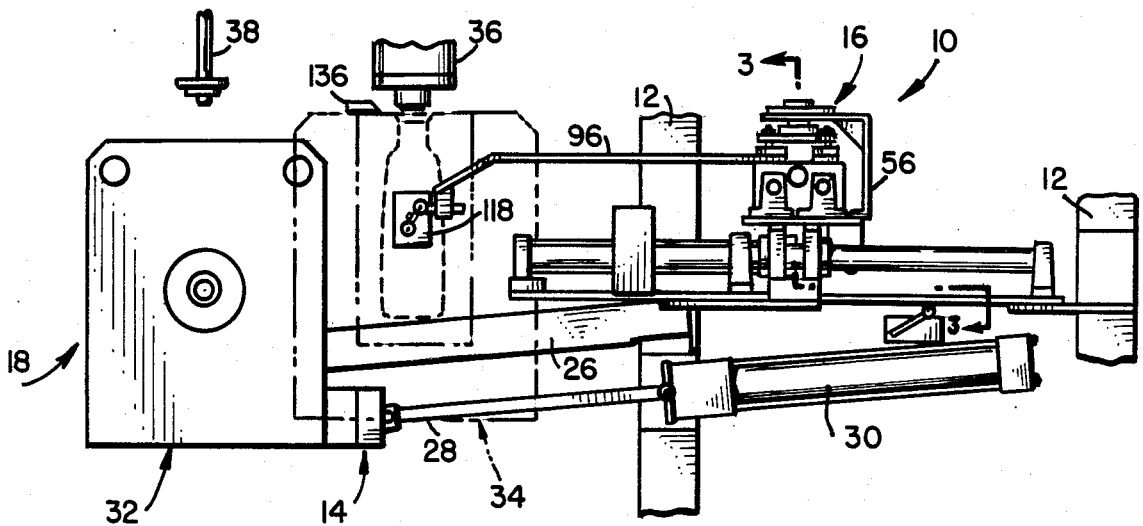
FIG. 1 is a side view, shown partially broken away, of an in-mold labeling machine according to the invention.

Shuttle-type blow molding machine 10 includes a frame 12, a blow molding assembly 14 mounted on the frame and a label transfer assembly 16 also mounted on the frame immediately to one side of the blow molding assembly 14.

The blow molding assembly 14 includes a mold transfer carriage 18 with a pair of blow mold halves 20 and 22 which are selectively opened and closed during the blow molding process. Each mold half is provided with a recess 24 such that when the halves are closed the recesses define a blow mold cavity. A vacuum manifold (not illustrated) in each mold half 20, 22 opens at a plurality of holes formed on the bottoms of the recesses 24 for holding labels within the recesses prior to and during blow molding and bonding of the labels to the molded container. The manifolds are connected to a vacuum source throughout operation of machine 10.

The mold transfer carriage is mounted on a pair of spaced parallel slide rods 26 permanently secured to frame 12. As shown in FIG. 1, piston rod 28 of fluid cylinder 30 is secured to the carriage 18. The cylinder is mounted on frame 12 so that extension of the fluid cylinder positions the mold transfer assembly at blow mold station 32 as shown in FIG. 1 and retraction of the cylinder 30 moves the carriage 18 along the rods to the extrusion station 34. A parison extrusion head 36 is located above the mold halves when at the extrusion station and a blow head 38 is located above the mold halves when at the blow molding station. Slide rods 26 extend downwardly at a shallow angle from the extrusion station to the blow mold station so that movement of the assembly along the rods shifts the mold halves both downwardly and laterally away from the extrusion head 36. See FIG. 1.

Label transfer assembly 16 is located adjacent extrusion station 34. Assembly base plate 40 is mounted on frame 12. A pair of spaced, parallel slide rods 42 are mounted on plate 40 in end blocks 44 with the rods 42 extending in a direction toward the extrusion station. Label transfer carriage 46 shown in FIGS. 3 and 4 includes a support plate 48 above plate 40, a pair of like slide bodies 50 and 52 and a top plate 54 spaced above plate 48. The top plate is joined to the base plate by support 56.

Figure 2:
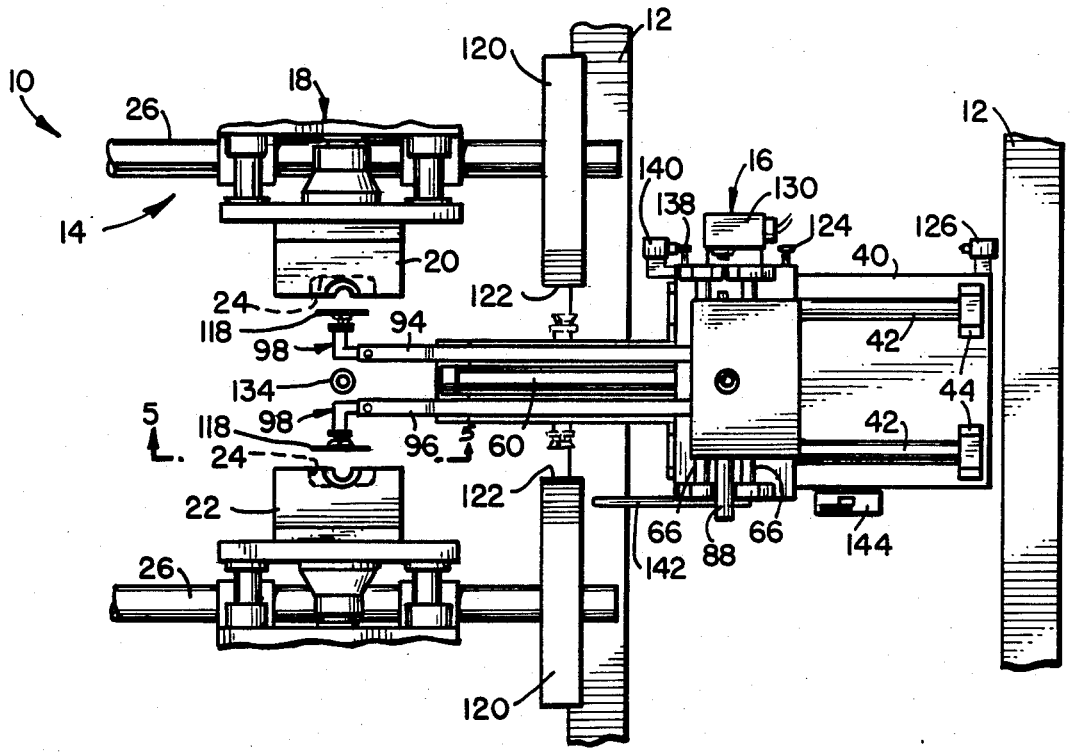
FIG. 2 is a plan view of FIG. 1 with the mold carriage in a different position.

The label transfer carriage 46 is mounted on rods 42 by means of slide bushings 58 mounted on the lower surface of plate 48. Fluid cylinder 60, shown in FIG. 2, is mounted on an extension of plate 40 and includes a piston rod 62 attached to a bracket 64 mounted on the bottom of plate 48 so that retraction and extension of the cylinder 60 moves the label transfer carriage 46 along rods 42 toward and away from the adjacent extrusion station 34 of blow molding assembly 14.

Figure 4:
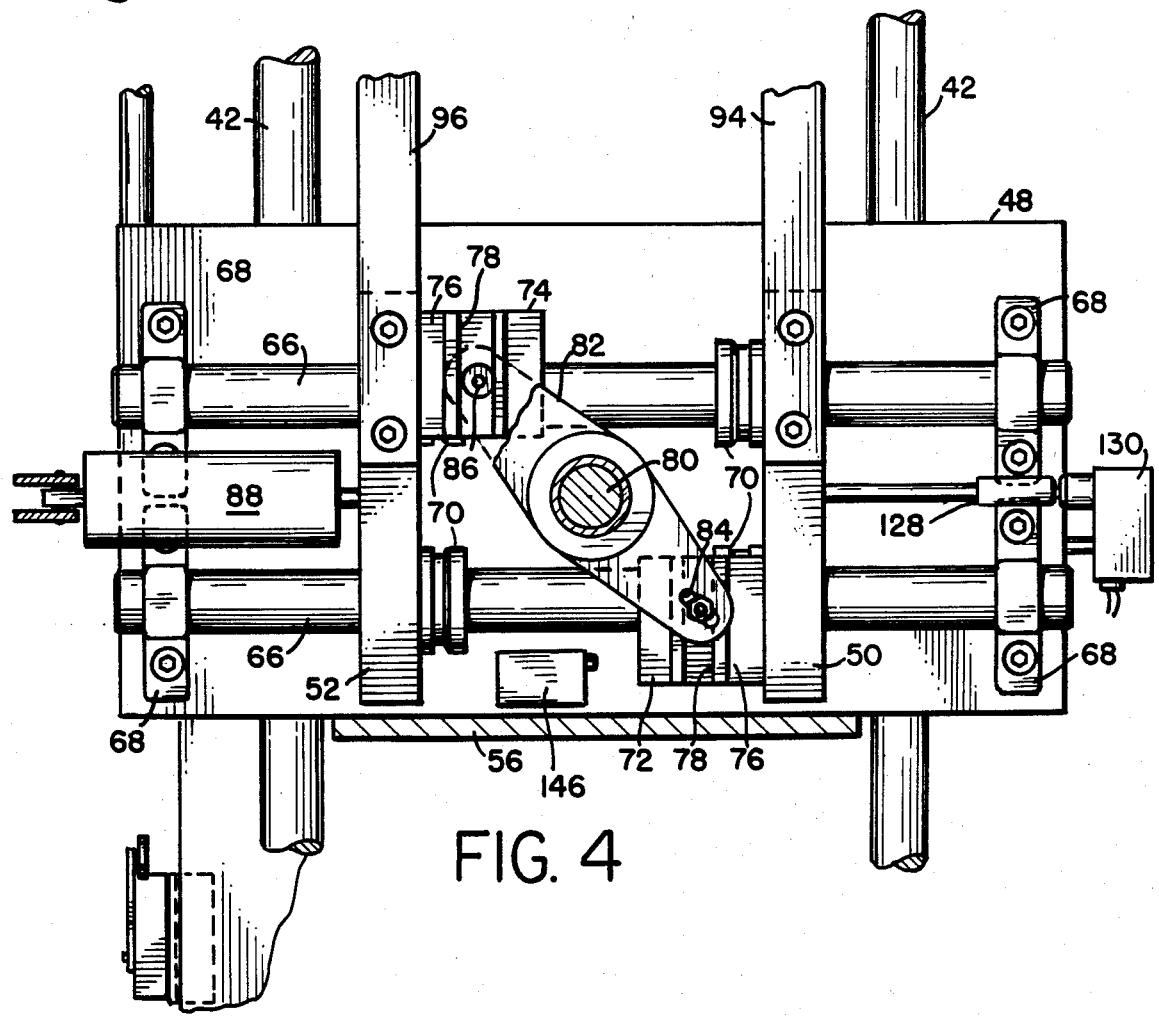
FIG. 4 is a view taken along line 4—4 of FIG. 3.

A pair of spaced parallel slide rods 66 are mounted on the top of plate 48 in end blocks 68. These rods extend perpendicularly to slide rods 42. Rods 66 are located beneath the top plate 54. The slide bodies 50 and 52 carry bushings 70 on rods 66 permitting movement of the slide bodies along the rods. Each slide body 50, 52 is provided with a bracket 72, 74 facing the other slide body with the two brackets located on opposite ends of the bodies as illustrated in FIG. 4. A groove member 76 is secured to the top of each bracket 72, 74 and includes a groove 78 extending perpendicular to the axis of the slide rods 66.

Vertical pivot shaft 80 is journaled in a bearing on top plate 54. A double ended pivot arm 82 is mounted on the lower end of shaft 80 and is provided with a radial adjustment slot 84 at each arm end. Roller cam followers 86 are mounted in the slots at the ends of arm 82 and extend downwardly from the arm into the grooves 78 of members 76. See FIG. 3. The followers have a close fit within the grooves 78. The followers are preferably located equal distance from the axis of shaft 80.

Figure 3:
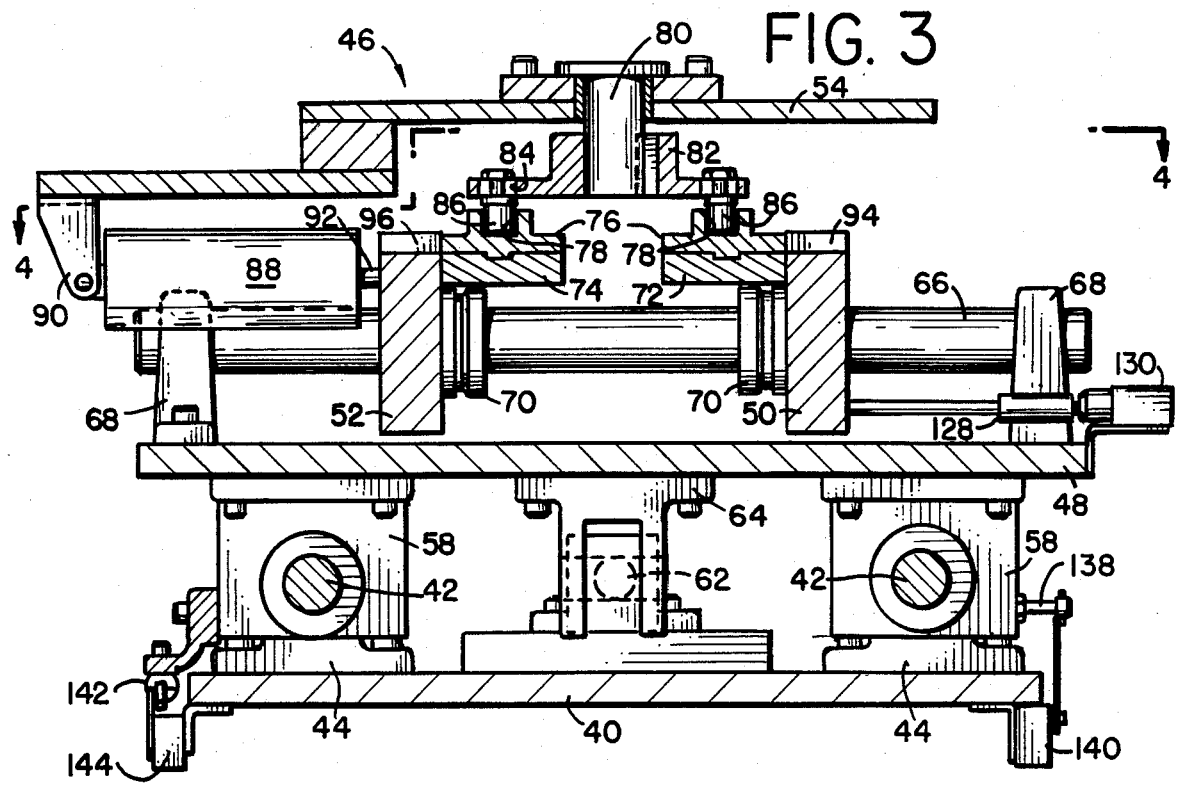
FIG. 3 is an enlarged sectional view taken generally along line 3—3 of FIG. 1.

A fluid cylinder 88 is located outwardly of slide body 52 and is secured to the top plate 54 by bracket 90. The free end of piston rod 92 of cylinder 88 is attached to the slide body 52 such that extension of the cylinder moves the slide body from the position of FIGS. 2 and 3 toward the center of the label transfer apparatus 16 and retraction of the cylinder withdraws the slide body to the illustrated position. Movement of slide body 52 along the rods 66 in one direction, moves the groove member 76 on bracket 74 to rotate the pivot arm 82 thereby moving the slide body 50 along the rods 66 in the opposite direction. The pivot arm and groove connections at the members 76 join the two slide bodies 50 and 52 together to assure that they move along the slide rods 66 like distances but in opposite directions in response to extension and retraction of cylinder 88. When cylinder 88 is extended the slide bodies move together toward each other until brackets 72 and 74 on each slide body engage the other body, thereby determining the minimum or closed slide body position. Alternatively, the closed position may be determined by suitable stops. Retraction of the fluid cylinder 88 moves the slide bodies apart until the bodies engage adjustable stops or the cylinder is fully retracted to determine the maximum or open slide body position as shown in FIGS. 3 and 4.

Like elongate label transfer arms 94, 96 extend from the label transfer carriage 46 toward the extrusion station 34. Arm 94 is bolted to the top of the slide body 50 and arm 96 is similarly bolted to the top of slide body 52. The arms 94 and 96 extend directly toward the apparatus, parallel to the axis of slide rods 42.

Figure 5:
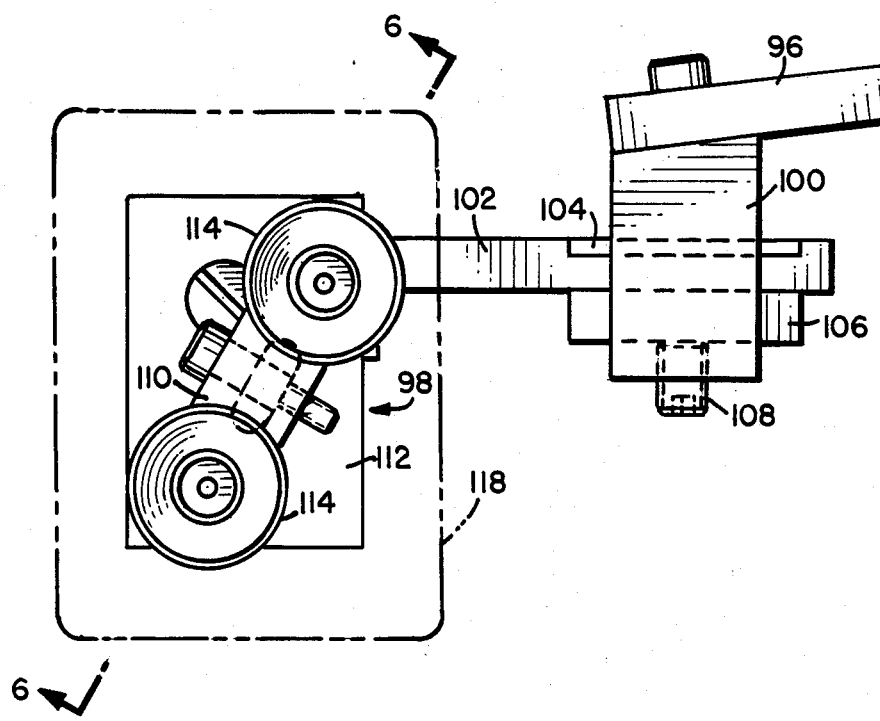
FIG. 5 is a view taken along line 5—5 of FIG. 2.
Figure 6:
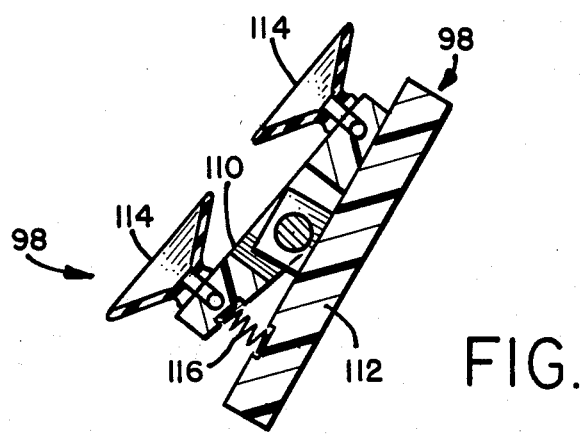
FIG. 6 is a sectional view taken along line 6—6 of FIG. 5.

A vacuum label transfer head 98 is provided on the free end of each arm 94 and 96. As shown in FIGS. 5 and 6, the head includes a mounting block 100 on the end of the arm. The head 98 is formed from plastic parts and includes a plastic mounting bar 102 having a metal mounting plate 104 on one side thereof. The bar extends into a slot formed in block 100, together with a spacer 106, and is clamped within the slot by screw 108. The spacer 106 has the same thickness as the bar 102 so that when desired a pair of like label transfer heads 98 may be carried on the end of a single arm to permit simultaneous transfer of labels from pairs of magazines to a duel cavity shuttle-type molding machine.

Plastic pivot arm 110 is rotatably mounted on support 112 on the end of arm 102 and carries a pair of flexible vacuum cups 114. Spring biases 116 the arm 110 so that one vacuum cup 114 projects outwardly of the support further than the other vacuum cup. The vacuum cups are used to hold labels 118 on the label tranfer heads 98. The spring and pivot arm assure one cup 114 contacts the label before the other cup for improved label pickup. This arrangement also improves transfer of labels to mold recesses. The cups are joined to a vacuum source through suitable vacuum lines and control valve as more fully pointed out during the description of the operation of apparatus 10. The heads are formed of plastic to reduce injury to the mold halves in the event the mold should close on the heads.

A pair of like conventional label magazines 120 are mounted on frame 12 between the label transfer carriage and the extrusion station of the assembly 14. Magazines 120 maintain a supply of individual labels 118 at pickup locations 122 located equal distance to either side of the arms 94 and 96 and spaced apart from each other the same distance as the bottoms of the blow mold recesses 24 are spaced apart when the mold halves are open. See FIG. 2. It is contemplated that different types of molds may be used in forming containers using inmold label machine 10 and, in some cases, the depths of the mold recesses which receive the labels may vary. In order to accommodate molds of different depths, the label magazines 120 are adjustably mounted on frame 12 to assure that the label pickup locations 122 are spaced apart a distance equal to the distance between the bottoms of the mold recesses when the mold halves are open. The open or maximum spacing between the slide bodies 52 is likewise adjustable to accommodate different depth mold halves and to assure that the slide bodies and label transfer heads 98 move apart a distance sufficient to pick up labels at locations 122 and deposit the labels in the mold recesses.

The operation of machine 10 will now be described. During operation a continuous parison 134 is extruded from head 36, the mold transfer carriage is moved back and forth between stations 32 and 34, the mold halves open and close, capture the parison, and transfer the parison to station 32 and the parison is expanded to form a blow molded container. Prior to capturing the parison, the label transfer assembly automatically and accurately places a pair of labels 118 in desired label discharge locations at the bottoms of the mold recesses 24 so that when the mold halves close about the parison and the parison is blow molded the labels form an integral part of the resultant container.

One entire cycle of operation will be described, starting from a position after labels carried by heads 98 have been tranferred to the recesses 28. In this start position the mold halves 20 and 22 are open and fluid cylinder 30 is retracted so that the mold transfer carriage 18 is at the extrusion station 34. Fluid cylinder 60 is retracted and the label transfer carriage 46 is located as shown in FIGS. 1 and 2 in the forward position adjacent the extrusion station. Fluid cylinder 88 is also retracted so that slide bodies 50 and 52 are apart in the open position and the label transfer heads 98 are to either side of the parison 134 and in the mold recesses. The vacuum cups 114 on the transfer heads physically hold labels 118 against the bottoms of the mold recesses 24. The vacuum manifold in the mold halves is connected to a source of vacuum which holds the labels against the bottoms of the mold cavities. The cups 114 are disconnected from the vacuum source to assure that the labels are vacuum retained against the mold halves in desired locations when the heads are retracted. At the start position the contact member 138 carried by a slide bushing 58 on plate 48 engages the trigger of microswitch 140 on plate 40 and the adjustable contact arm 128 extending outwardly to one side from slide body 50 engages the trigger of microswitch 130 carried by plate 48.

The arms and heads are maintained motionless in the start position until the end of a timing or dwell interval sufficient to assure that the vacuum source has cleared the vacuum manifolds and associated lines in the mold halves so that the lables are securely held in the mold recesses. This interval may be short or as long as a few seconds. In some cases the labels are immediately transferred to the mold halves without the necessity of a delay interval. The arms 94 and 96 are separated during this interval and microswitch 130 is actuated. Upon expiration of the timing interval the control valve for fluid cylinder 88 is reversed and the cylinder is extended so that the slide bodies, arms and transfer heads are moved to the closed, minimum position of FIG. 2 with the labels retained in the mold recesses. Sufficient room is provided between the mold halves and the parison 134 to permit withdrawal of the heads from the cavities without contacting the parison.

When the slide bodies are moved to the closed position body 50 engages the trigger of microswitch 146 on plate 48 to shift the control valve for fluid cylinder 60 from a center position to extend the cylinder and retract the carriage 46 from the extrusion station. When the carriage has retracted a distance sufficient to withdraw the label transfer heads 98 from between the mold halves 20 and 22 trigger bar 142 carried on a slide bushing 58 on plate 48 engages the trigger of microswitch 144 on plate 40 to initiate the cycle of operation of blow molding assembly 14.

The cycle of operation of assembly 14 includes closing of mold halves 20 and 22, with the labels vacuum-held in the mold recesses, about the parison 134, actuation of knife 136 located above the mold halves to sever the captured portion of the parison from the portion extending from head 36, shift the control valve for fluid cylinder 30 to extend the cylinder and thereby shift the mold transfer carriage 18 along slide rods 26 so that the carriage is moved down and away from the extrusion station 34 to the blow mold station 32. The downward motion is required in order to clear the closed mold halves from the growing new parison continuously extruded from head 36. When the fluid cylinder 30 is fully extended and the carriage 18 is at station 32 blow head 38 engages the exposed upper end of the captured parison to expand the parison in the mold cavity and form a container having a shape defined by the shape of the cavity. During blow molding of the parison, the labels are bonded to the sides of the blow molded container. Following blow molding head 38 is retracted, the mold halves are opened, the completed container is ejected from between the mold halves and the cylinder 30 is retracted to return the carriage 18 to the extrusion station.

As the blow mold assembly 14 cycles the cylinder 60 continues to retract the label transfer carriage to withdraw the arms 94 and 96 and heads 98 away from the extrusion station. When the cylinder is fully extended, the heads are located in the dotted position shown in FIG. 2 opposite labels at the label pickup locations 122.

When in this position, contact member 124 on a bushing plate 48 engages the trigger of microswitch 126. Actuation of this microswitch shifts the control valve for cylinder 60 to a center, blocked position, initiates a timing interval, connects the vacuum cups 114 on heads 98 to a source of vacuum and shifts the control valve for fluid cylinder 88 to retract the cylinder, thereby moving the slide bodies 50, 52 to the open position so that the vacuum cups are moved against the labels at locations 122. When the slide bodies 50 and 52 are at the full open position the contact arm 128 on body 50 engages the trigger of microswitch 130. The label transfer carriage dwells in this position until expiration of the timing interval. The interval assures the vacuum cups capture the labels. The interval may be short or long, as required. In some cases no timing or dwell interval is required to capture the labels.

Actuation of the microswitch 130 assures that the slide bodies have been fully separated and the heads are in proper position for pickup of the labels. When the time interval, if any, elapses with microswitch 130 actuated, the control valve for fluid cylinder 88 is shifted to extend the cylinder and move the slide bodies, arms and heads together with the held labels to the closed position. When cylinder 88 is fully extended slide body 50 actuates the trigger of microswitch 146 on plate 48.

During these operations of the label transfer assembly, the blow mold halves have captured the parison and moved to the blow mold station 32. As the mold transfer carriage with closed mold halves moves away from the extrusion station a sufficient distance to be out of the path of movement of heads 98 and labels 118 carried by the heads toward the extrusion station a contact member carried by the mold transfer carriage engages the trigger of a fixed safety microswitch (not illustrated).

Upon actuation of both the safety microswitch and 146, the control valve for fluid cylinder 60 is shifted from the center position to retract the cylinder and move the lable transfer carriage forward toward the extrusion station to the position of FIG. 2 with the heads 98 to either side of the continuously growing parison 134 and labels 118 positioned for placement in the mold recesses. When the label transfer carriage 46 is fully extended a contact member 138 extending from a slide bushing 58 on plate 48 engages the trigger of fixed microswitch 140 on plate 40. Actuation of this microswitch shifts the control valve for fluid cylinder 60 to a neutral position. The blow mold assembly 14 includes a safety circuit which assures the mold halves are opened before cylinder 30 is retracted. Retraction of cylinder 30 moves the mold transfer carriage with the open mold halves from the blow mold station 32 back to the extrusion station 34 as illustrated in FIG. 2. The interior faces of the mold halves are spaced beyond the labels 118 carried on heads 98. When in the extrusion station, the mold recesses 24 are opposite the labels 118.

Return of the mold halves to the extrusion station 34 brings a contact member on the mold transfer carriage 18 (not illustrated) into engagement with the trigger of a fixed microswitch (not illustrated) which in turn actuates the control valve of fluid cylinder 88 to retract the cylinder and move the slide bodies and heads 98 apart so that the labels 118 are moved against the bottom of the mold cavities. Vacuum is continuously supplied to the vacuum manifolds in the mold halves to retain the labels in place. Actuation of this microswitch also initiates a timing interval.

The cycle of operation is completed when the slide bodies and label transfer heads are fully separated in the open position, the labels are seated in the mold recesses and slide body 50 engages the trigger of microswitch 130 to disconnect the vacuum cups 114 from the vacuum source. The machine cycles continuously with the next cycle of operation commencing with running of the time interval as described.

While the mold transfer assembly 18 is disclosed as including a single pair of mold halves it is contemplated that the label transfer carriage may include a number of pairs of like mold halves so that the blow molding machine manufactures a plural number of containers during each cycle of operation. In such case the label transfer arms 94 and 96 are provided with a number of pairs of label transfer heads 98 equal to the number of pairs of mold halves. The heads are spaced apart along the arms at distances equal to the spacing between the mold recesses in the mold halves. An additional number of pairs of label magazines are provided on frame 12 at proper locations to supply labels to the pairs of transfer heads 98. With these changes, the label transfer assembly and blow molding assemblies operate as described to produce a number of labeled containers equal to the number of mold halves for each cycle of operation.

The rate at which the shuttle-type blow molding machine 10 produces labeled containers depends in major part upon the amount of time required to blow mold the container. This in turn is dependent upon the size and shape of the container and other factors well known in the blow molding industry. The location of the label transfer assembly immediately adjacent the extrusion station and the integration of the cycles of operation of the two assemblies permits production of labeled containers at a rate which is essentially the same as the rate of production of unlabeled containers.

The mold halves used in shuttle-type blow molding machine 10 produced blow molded plastic containers with one or more labels secured at desired locations on the container. Most frequently these containers are labeled bottles with threaded mouths suitable for receiving a cap to seal the contents within the bottle.

The fluid cylinders used to drive the label transfer assembly may be hydraulic or pneumatic as required. Suitable flow controls and the like may be used to facilitate rapid but accurate extension and retraction of the fluid cylinders to assure proper label placement in the mold halves. If desired, slide bodies 50 and 52 may be moved between the open and closed positions by a drive rotating shaft 80, rather than by cylinder 88 which moves slide body 52.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. A label transfer assembly adapted to place labels in label discharge locations at the bottoms of recesses in open mold halves of a blow molding machine, the assembly including a label transfer carriage, first guide means supporting the label transfer carriage for forward and back movement along a first path toward and away from the label discharge locations, first drive means for moving the label transfer carriage forward and back along the first path, a pair of slide bodies, second guide means supporting the slide bodies on the label transfer carriage for movement back and forth along a second path extending transverse to said first path, a mechanical drive connection directly joining the slide bodies comprising a shaft rotatably mounted on the label transfer carriage between the slide bodies, a double ended pivot arm centrally mounted on the shaft with the ends of the arm extending towards the slide bodies, and a pair of follower and groove connections each joining one end of the pivot arm to one of the slide bodies so that the arm directly joins the slide bodies to form a direct drive between the slide bodies, said connections being located at laterally offset locations with respect to said second path such that movement of one slide body in either direction along said second path is transmitted through the connections and arm to the other slide body reversed in direction to move the other slide body along the second path in an opposite direction, second drive means for simultaneously moving said slide bodies along said second path in opposite directions between closed and opened positions, label transfer heads mounted on the slide bodies and a pair of label magazines on the assembly, the magazines including means for supplying labels at opposed spaced label pickup locations whereby the first drive means moves the label transfer carriage back and forth between locations where the label transfer heads are adjacent the pickup locations and the label discharge locations and the second drive means moves the slide bodies between closed and open positions and the label pickup heads are moved from retracted positions to positions adjacent the label pickup and label discharge locations, dependent upon the position of the label transfer carriage.

2. A label transfer assembly as in claim 1 wherein both paths are straight and the second path is generally perpendicular to the first path.

3. A label transfer assembly as in claim 1 wherein each follower comprises a roller having a close fit in one of the grooves.

4. A label transfer assembly as in claim 1 wherein the second path is straight, said second guide means comprises a straight slide shaft on the carriage extending along the second path and said slide bodies as mounted on said slide shaft for movement therealong in response to movement of said second drive means.

5. A label transfer assembly as in claim 4 including a second slide shaft on the carriage parallel to the first shaft, said slide bodies each including bushings mounted the slide bodies on both said shafts, and wherein the said grooves are located on the slide bodies and extend transverse to the second path and said arm includes rollers on the free ends thereof, each roller having a sliding fit within a groove.

6. A label transfer assembly as in claim 5 wherein each slide body includes a bracket extending therefrom toward the other slide body, said brackets being laterally offset with respect to the second path and said grooves being located on the brackets, one bracket including a stop surface engagable with the other slide body when the bodies are in the closed position and an adjustable stop on the carriage in position to engage one slide body when the slide bodies are in the open position.

7. A label transfer assembly as in claim 6 wherein said second drive means comprises a double action fluid cylinder engagable with one of said slide bodies for moving both slide bodies back and forth along the second path.

8. A label transfer assembly as in claim 1 wherein one slide body includes a stop facing the other slide body, such stop engaging the other slide body when the bodies are in the closed position.

9. A label transfer assembly as in claim 8 including an adjustable stop on the carriage in position to engage one slide body when the slide bodies are in the open position.

10. A label transfer assembly as in claim 1 wherein said drive means comprises a fluid cylinder engagable with one of said slide bodies for movement of both slide bodies back and forth along the second path.

11. A label transfer assembly as in claim 1 wherein second drive means rotates said arm to move the slide bodies back and forth along the second path.

* * * * *

UNITED STATES PATENT AND TRADEMARK OFFICE
CERTIFICATE OF CORRECTION

PATENT NO. : 4,616,992
DATED : October 14, 1986
INVENTOR(S) : Paul M. Oles

It is certified that error appears in the above—identified patent and that said Letters Patent is hereby corrected as shown below:

Cover page, line 73 assignee should be --Technipack Corp.--, not "Y Technipak Corp.".

In the specification, column 6, line 40 change "lable" to --label--.

In the claims, claim 5, line 3, change "mounted" to --mounting--.

Signed and Sealed this

Thirtieth Day of December, 1986

Attest:

DONALD J. QUIGG

*Attesting Officer*  *Commissioner of Patents and Trademarks*